US010939359B2

(12) United States Patent
Abanto Leon et al.

(10) Patent No.: US 10,939,359 B2
(45) Date of Patent: Mar. 2, 2021

(54) LOCATION-BASED COMMUNICATION

(71) Applicant: NXP B.V., Eindhoven (NL)

(72) Inventors: Luis Fernando Abanto Leon, Chorrillos (PE); Arie Geert Cornelis Koppelaar, Giessen (NL); Sonia Marcela Heemstra de Groot, Hengelo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/449,699

(22) Filed: Jun. 24, 2019

(65) Prior Publication Data

US 2020/0404578 A1 Dec. 24, 2020

(51) Int. Cl.
*H04W 48/18* (2009.01)
*H04W 48/06* (2009.01)
*H04W 74/08* (2009.01)
*H04W 72/04* (2009.01)

(52) U.S. Cl.
CPC ............ *H04W 48/06* (2013.01); *H04W 48/18* (2013.01); *H04W 72/0453* (2013.01); *H04W 74/0858* (2013.01)

(58) Field of Classification Search
CPC ............. H04W 48/06; H04W 74/0858; H04W 72/0453; H04W 48/18; H04W 4/40; H04W 72/08
See application file for complete search history.

(56) References Cited

U.S. PATENT DOCUMENTS

| 10,638,478 | B2 * | 4/2020 | Nikopour .......... H04W 72/0453 |
| 2015/0087350 | A1 | 3/2015 | Wang et al. |
| 2016/0234855 | A1 | 8/2016 | Panteleev et al. |
| 2019/0075548 | A1 * | 3/2019 | Lee .......... H04W 4/40 |
| 2019/0116475 | A1 * | 4/2019 | Lee .......... H04W 72/02 |

FOREIGN PATENT DOCUMENTS

| CN | 101124764 A * | 2/2008 | ....... H04L 1/0003 |
| WO | WO2017171909 A1 | 10/2017 | |
| WO | 2018064179 A1 | 4/2018 | |

OTHER PUBLICATIONS

MacKay, David, "Chapter 20. An Example Inference Task: Clustering," Information Theory, Inference and Learning Algorithms, Cambridge University Press. pp. 284-292 (2003).
Burkardt, John. "K-means clustering" Virginia Tech, Advanced Research Computing, Interdisciplinary Center for Applied Mathematics, 2009.

(Continued)

*Primary Examiner* — Mohamed A Kamara

(57) ABSTRACT

Aspects of the disclosure are directed to a communications environment involving a plurality of remote transmitters that communicate over respective subchannels. As may be implemented in accordance with one or more embodiments, energy characteristics of wireless transmissions received from one of the remote transmitters and a location that remote transmitter are respectively ascertained, for each of such subchannels. One of the subchannels is selected based on the ascertained energy characteristics and locations of the remote transmitters, and data is generated for transmission over the selected one of the subchannels.

17 Claims, 4 Drawing Sheets

(56) References Cited

OTHER PUBLICATIONS

"C-V2X: Sidelink focus", C-V2X Tutorial Session, ETSI TC ITS #28, Qualcomm, Oct. 9, 2017.
Gonzalez-Martin et al, "Analytical Models of the Performance of C-V23X Mode 4 Vehicular Communications," 2018.
Enhanced C-V2X mode-4 subchannel selection, Eindhoven Univerisity of Technology (2019).
ETSI EN 302 637-2 V1.4.1 (Apr. 2019), European Standard, Intelligent Transport Systems (ITS); Vehicular Communications; Basic Set of Applications; Part 2: Specification of Cooperative Awareness Basic Service.
ETSI EN 302 637-3 V1.4.1 (Apr. 2019), European Standard, Intelligent Transport Systems (ITS); Vehicular Communications; Basic Set of Applications; Part 3: Specification of Decentralized Environmental Notification Basic Service.
Qualcomm Incorporated, "Details of Sensing for V2V", 3GPP Draft, R1-165910 QC V2V Sensing, 3rd Generation Partnership Project, May 2016.

* cited by examiner

LOCATION-BASED COMMUNICATION

OVERVIEW

Aspects of various embodiments are directed to apparatuses and methods involving communication over a medium utilized by a plurality of transmitters.

Various communication environments utilize a common medium for communications transmitted and/or received at various communication nodes. For instance, in vehicle-to-vehicle or vehicle-to-everything (V2X) environments, multiple vehicles may communicate with one another and/or with other communication nodes such as traffic lights, pedestrian-carried devices and others. Under such conditions, communication nodes may inadvertently select the same subchannel, such as when re-scheduling is required. For instance, when two or more vehicles in close proximity select the same subchannel, conflicts and deleterious co-channel interference may occur.

These and other matters have presented challenges to communication efficiencies and quality, for a variety of applications.

SUMMARY

Various example embodiments are directed to issues such as those addressed above and/or others which may become apparent from the following disclosure concerning shared usage of communications mediums, and efficiently/accurately ensuring communications.

In certain example embodiments, aspects of the present disclosure involve utilizing location-based information for ascertaining and selecting channel/subchannels for local communication environments. Energy of various communications may also be utilized in connection with the location-based information. Generally, these approaches can be used to facilitate subchannel or other communication medium selection in a manner that mitigates potential issues such as those characterized in the Background above.

In a more specific example embodiment, a method for use in a communications environment involving a plurality of remote transmitters that communicate over respective subchannels, is carried out as follows. For each of the subchannels, energy characteristics of wireless transmissions received from one of the plurality of remote transmitters over the subchannel, and a location of the remote transmitter that communicates via the subchannel, are respectively ascertained. One of the subchannels is selected based on the ascertained energy characteristics and locations of the remote transmitters, and data is generated for transmission over the selected one of the subchannels.

Another embodiment is directed to an apparatus for use in a communications environment involving a plurality of remote transmitters that communicate over respective subchannels. The apparatus includes respective circuitry, which may be combined in a single processor circuit, as follows. First circuitry is configured to ascertain, for each of the subchannels, energy characteristics of wireless transmissions received from one of the plurality of remote transmitters over the subchannel as well as a location of the remote transmitter that communicates via the subchannel. Second circuitry is configured to select one of the subchannels based on the ascertained energy characteristics and locations of the remote transmitters, and the third circuitry is configured to generate data for transmission over the selected one of the subchannels.

Another embodiment is directed to a method in which a plurality of wireless communications from different transmitters are carried out over a cellular vehicle-to-everything (V2X) communications network. Energy characteristics of each of the wireless transmissions as well as location data in the wireless transmission, which is indicative of a location of the transmitter via which the wireless transmission was sent, are collected. A subchannel in the V2X communication network is selected based on the ascertained energy characteristics and location data for the respective wireless communications. Data is then transmitted in the V2X communication network using the selected subchannel.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
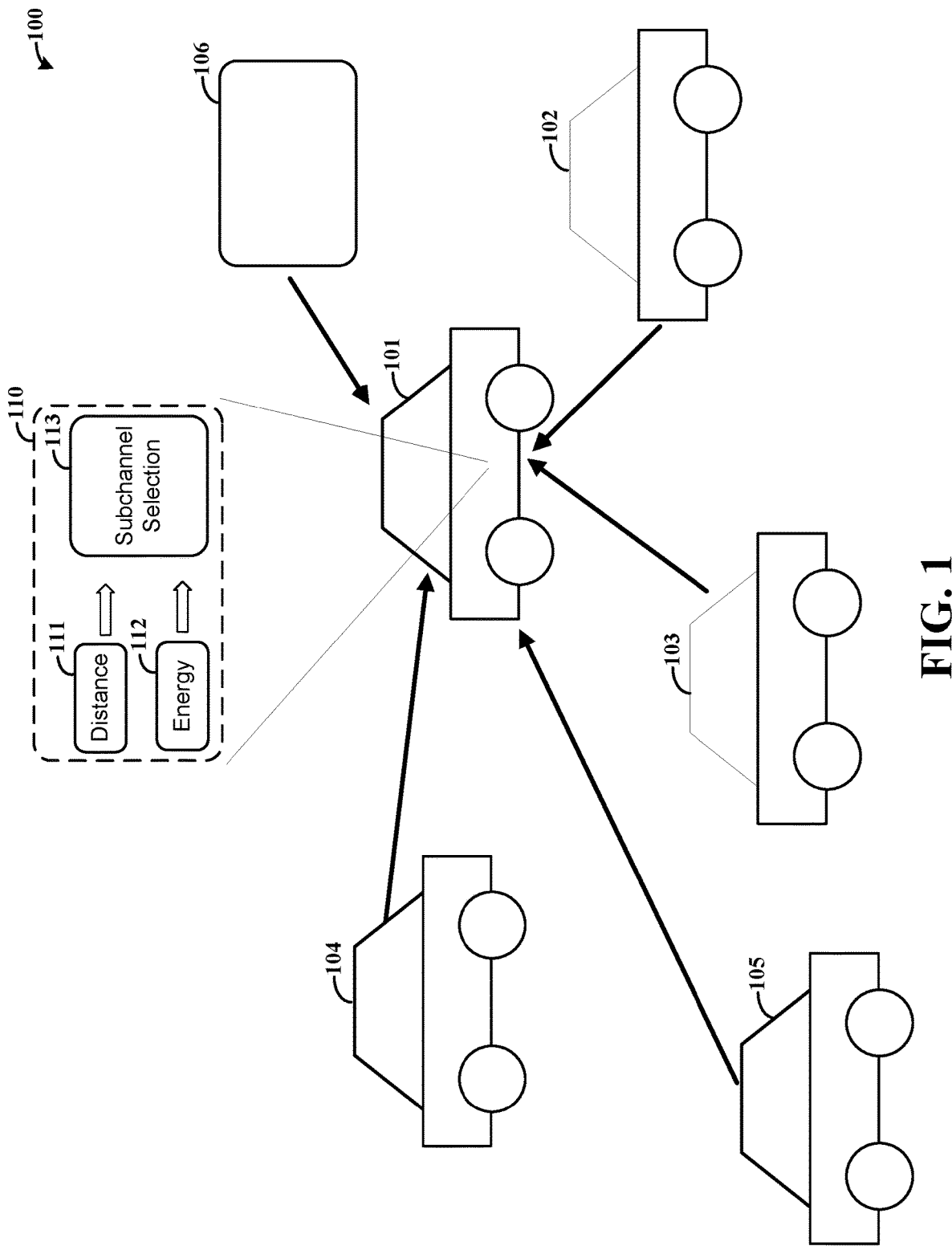
FIG. 1 shows an apparatus and system, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communications between respective circuits or vehicles located at disparate distances. In certain implementations, aspects of the present disclosure have been shown to be beneficial when used in the context of vehicle-to-everything (V2X) communications, in which a plurality of vehicles that communicate are in motion and share the V2X communication environment. In some embodiments, energy associated with communications as well as a location of the source of the communications are ascertained and used for sharing a communication environment. For instance, subchannels or resource blocks in a V2X communication environment can be selected and used for communication based on ascertained energy and transmitter locations, in a manner that facilitates sharing of communication resources and address issues such as those noted in the Background above. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various aspects of the disclosure are directed to the use of latent information pertaining to transmitter location, which can be used to enhance the performance of communications such as V2X links, such as those utilized in centralized and/or distributed modes. More specifically, subchannels can be selected based on current subchannel use by other transmitters operating in a local environment, and using location information associated with the other transmitters. For instance, subchannel communications by transmitters located at greater distances, such as near an outer range of communications, can be weighted lower or otherwise ascertained in a manner that emphasizes or prioritizes avoidance of subchannels used by transmitters that are closer. When employed with V2X communications, this facilitates communications in a manner that mitigates collisions or other issues involving communications with vehicles that are near one another.

Various embodiments are directed to C-V2X (cellular V2X) mode-4 communications, as defined in the 3rd Generation Partnership Project (3GPP) Release 14, which expressly supports vehicular communications in scenarios without network coverage. Energy and source location of communications utilizing C-V2X are utilized to mitigate the inadvertent selection of the same subchannel by two vehicles, such as when re-scheduling is required. This mitigates conflicts and co-channel interference. For instance, by reusing subchannels utilized by vehicles at geographically distanced locations, conflicts with communications carried out by nearby vehicles can be mitigated. Accordingly, in connection with some embodiments a distributed subchannel scheduling scheme is based on unsupervised learning whereby vehicles can minimize the occurrence of conflicts and their impact by exploiting both geographical location and received power. The reliability of vehicle-to-vehicle links in the short range can be improved by efficiently utilizing sidelink subchannels.

In accordance with one or more embodiments herein, one or more transmitters may use each subchannel. For instance, each transmitter may utilize a resource block of the related communication medium as a time-frequency block in the subchannel.

Various embodiments are directed to implementation in communications environments in which each transmitter acts autonomously in selecting its own subchannel for communications. Such an approach may, for example, involve V2X communications such as C-V2X mode-4 in scenarios without network coverage. A subchannel scheduling scheme is implemented in three stages: (1) a power monitoring stage, (2) a ranking stage, and (3) a selection stage. This scheduling may be carried out at each transmitter, and may be carried out autonomously. In the monitoring stage, received power intensities across monitorable subchannels are assessed. In the ranking stage, a list is created with the subchannels sorted in ascending order of power intensity. In the selection stage, a subchannel is selected based on the ranking and location information associated with transmitters utilizing the subchannels.

Randomization or pseudo-randomizaton may be utilized to select one of a multitude of subchannels identified in the selection stage, which can mitigate selection of the same subchannel for different transmitters. For instance, when vehicles at geographically proximate positions experience similar subchannel conditions, similar candidate subchannels may be identified such that randomization or pseudo-randomization can facilitate selection of different subchannels for the geographically proximate vehicles.

Vehicles located at geographically distant positions are less susceptible to prohibitively high co-channel interference when utilizing a common subchannel, and as such the location of related transmissions can be processed accordingly. More specifically, while conflicts may not be prevented due the scarceness of sidelink subchannels, the impact of co-channel interference can be mitigated if subchannels are reutilized at geographically distanced locations. In this context it has thus been recognized/discovered that utilizing location information along with subchannel energy can facilitate subchannel selection and use in a manner that mitigates conflicts. As a result, the reliability of vehicle-to-vehicle links, especially in the short range can be leveraged.

Certain embodiments are implemented with centralized communications, in which a particular node performs clustering based on information obtained from a multitude of transmitters (e.g., vehicles). This clustering may be utilized for selecting subchannels for each of the transmitters in a local environment.

In a more specific example embodiment, a method is carried out in a communications environment involving remote transmitters that communicate over respective subchannels, as follows. For each of the subchannels, energy characteristics of wireless transmissions received from one of the remote transmitters over the subchannel, and a location of the remote transmitter that communicates via the subchannel, are respectively ascertained (e.g., in a receiver). The location may, for example, be ascertained using location information in the collected transmissions, such as data indicative of GPS coordinates. One of the subchannels is selected based on the ascertained energy characteristics and locations of the remote transmitters, and data is generated for transmission over the selected one of the subchannels. These steps of ascertaining and selecting may be repeated, for example based on a time period from an initialization and/or a period after one of the subchannels is selected.

Subchannel selection may be carried out in a variety of manners, to suit particular embodiments. In some embodiments, subchannels are selected which have an energy value that is lower than an energy value of other ones of the subchannels, and that is collected from one of the remote transmitters located at a distance that is greater than a distance at which other ones of the remote transmitters are located. In certain embodiments, data indicative of energy and a distance value of the remote transmitter from which the wireless transmission was collected are grouped into clusters including data from other ones of the wireless transmissions, based on the energy and distance values of the data. One of the subchannels is pseudorandomly selected from subchannels in one of the clusters depicting low energy values and high distance values, relative to subchannels in other ones of the clusters.

In certain embodiments, data points are created for the subchannels, in which each data point indicates energy of the wireless transmissions collected on the subchannel, and a distance value of the remote transmitter from which the wireless transmissions are collected (e.g., as two-dimensional data points). The data points are grouped into clusters based on the energy and distance values of the respective data points. One of the clusters that depicts low energy values and high distance values, relative to other ones of the clusters, is selected. From that cluster, one of the subchannels corresponding to one of the data points in the selected cluster is chosen, such as by pseudorandomly selecting the data point.

Another embodiment is directed to an apparatus for use in a communications environment involving remote transmitters that communicate over respective subchannels. The apparatus includes respective circuits/circuitry, which may be combined in a single processor circuit, as follows. First circuitry (e.g., including receiver circuitry) ascertains, for each of the subchannels, energy characteristics of wireless transmissions received from one of the remote transmitters over the subchannel, and to further ascertain a location of the remote transmitter that communicates via the subchannel. For instance, location data placed in the collected transmissions by the remote transmitters may be utilized to identify each transmitter's physical location. Second circuitry selects one of the subchannels based on the ascertained energy characteristics and locations of the remote transmitters, and third circuitry generates data for transmission over the selected one of the subchannels. The first and second circuitry may repeat the steps of ascertaining and selecting for a time period as may begin after selection of one of the subchannels and/or initiation. The first, second and third circuitry may, for example, be part of or make up a common processor circuit that carries out the respective functions of the first, second and third circuitry.

The second circuitry selects one of the subchannels in one of more of a variety of manners. In some embodiments, a subchannel is selected that has an energy value that is lower than an energy value of other ones of the subchannels, and that is collected from one of the remote transmitters located at a distance that is greater than a distance at which other ones of the remote transmitters are located. Such an approach may, for example, involve forming clusters depicting subchannels having similar distance and energy characteristic, and selecting a subchannel from the cluster that exhibits subchannels having lower energy and located at a greater distance than all other clusters.

In some implementations, the second circuitry creates data points for the subchannels in which each data point indicates both energy of the wireless transmissions collected on the subchannel and a distance value of the remote transmitter from which the wireless transmissions are collected. The data points are grouped into clusters based on the energy and distance values of the respective data points, and one of the clusters depicting low energy values and high distance values, relative to other ones of the clusters, is selected. From that selected cluster, one of the subchannels therein corresponding to one of the data points is selected (e.g., pseudorandomly) for use.

Another embodiment is directed to a method in which a plurality of wireless communications from different transmitters are carried out over a cellular V2X communication network. The wireless communications may, for example, be distributed communications in which each of the transmitters autonomously selects its own subchannel. Energy characteristics of each of the wireless transmissions as well as location data in the wireless transmission, which is indicative of a location of the transmitter via which the wireless transmission was sent, are collected. A subchannel in the V2X communication network is selected based on the ascertained energy characteristics and location data for the respective wireless communications. Data is then transmitted in the V2X communication network using the selected subchannel. In various embodiments, the transmitters share the V2X communication network via a pool of time-frequency resource blocks, and the energy characteristics and location data are ascertained for each communication received from the different transmitters in a respective time-frequency resource block.

In some implementations, the subchannel in the V2X communication network is selected by creating data points for the subchannels, where each data point indicates energy of a wireless transmission collected on the subchannel and a distance value of the transmitter from which the wireless transmission is collected. The data points are grouped into clusters based on the energy and distance values of the respective data points, and one of the clusters that depicts low energy values and high distance values (relative to other ones of the clusters) is selected. From the selected cluster, one of the subchannels in the cluster, which corresponds to one of the data points in the selected cluster, is selected.

Turning now to the figures, FIG. 1 shows an apparatus 110 and system 100, as may be implemented in accordance with one or more embodiments. By way of example, a plurality of vehicles 101-105 are shown participating in a wireless communication environment, along with an additional non-vehicle communication node 106 (e.g., a traffic structure or pedestrian-carried device). More or fewer communication nodes may be present, in a variety of applications. The apparatus 110 is shown as being implemented in connection with vehicle 101, and includes blocks 111 and 112 for respectively determining distance and energy of signals received from remote transmitters, as may be in the other vehicles 102-105 and node 106. A subchannel selection block 113 utilizes the distance and energy information at blocks 111 and 112 to select a subchannel for communication.

The apparatus 110 and respective blocks therein may be implemented in a variety of manners, as may the selection approach. For instance, the distance determination block 111, energy determination block 112, and subchannel selection block 113 may be implemented in a common processor circuit that receives signals from the remote transmitters and generates an output indicative of the selected subchannel. Further, subchannel selection at block 113 may, for example, be implemented using one or more approaches as discussed herein above and/or as shown in and described in connection with FIGS. 3 and 5.

In a particular implementation, the apparatus 110 operates as follows, with the various remote transmitters operating in the system 100 environment over a plurality of subchannels. For each of the subchannels via which communications are obtained, the distance block 111 ascertains the distance (e.g., location) of the transmitter in one of the other vehicles 102-105 or node 106 that is transmitting on the subchannel, relative to the vehicle 101. The energy block 112 ascertains energy characteristics of transmissions received on the sub-channel from the one of the transmitter. The subchannnel selection block 113 selects one of the subchannels based on the ascertained energy characteristics and locations of the remote transmitters. Data may then be generated for transmission over the selected one of the subchannels, from the vehicle 101.

Figure 2:
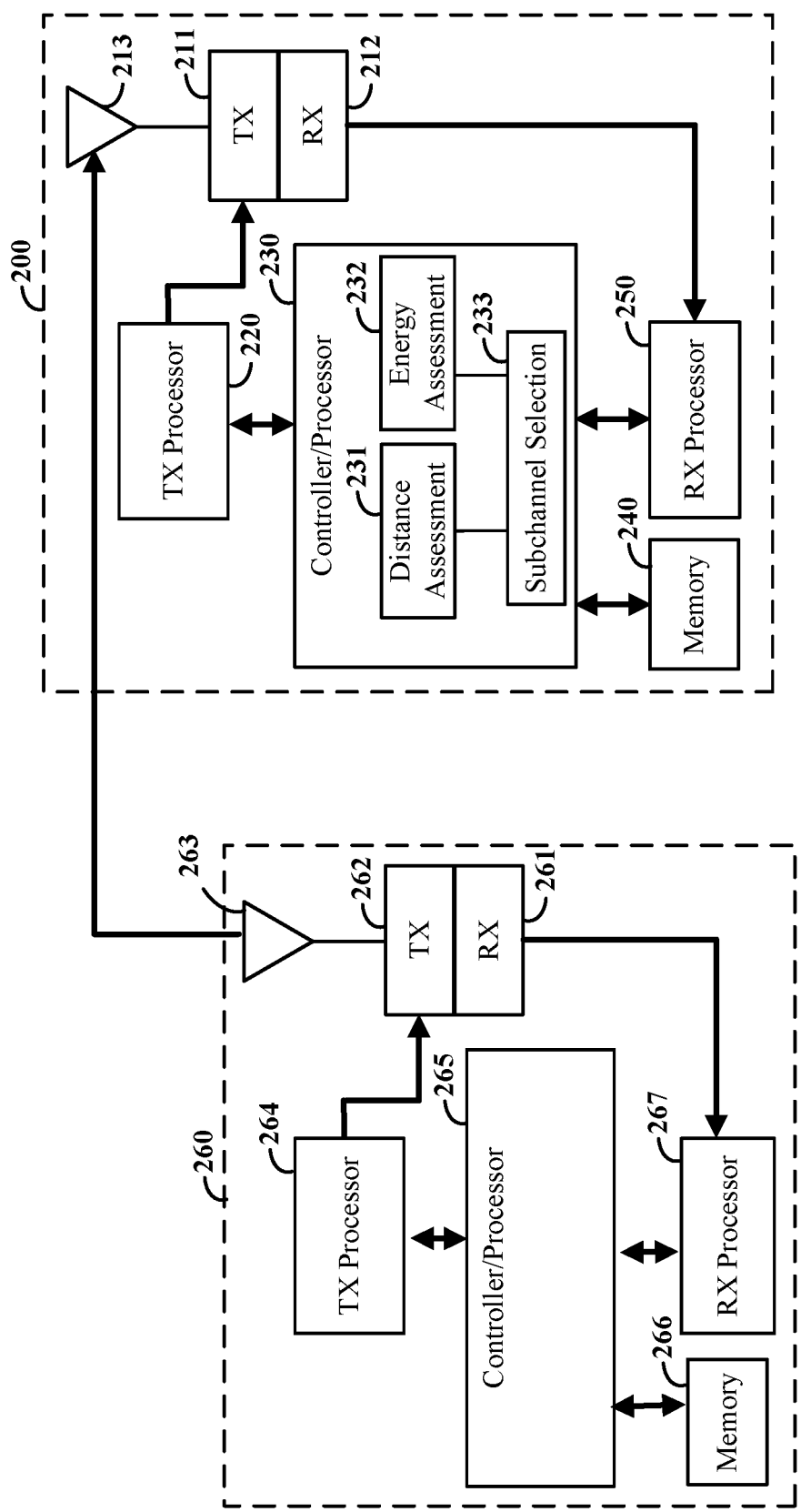
FIG. 2 shows a communications apparatus, as may be implemented in accordance with one or more embodiments.

FIG. 2 shows an apparatus 200, as may be implemented in accordance with one or more embodiments. The apparatus 200 is configured to communicate with a multitude of remote transmitters, including remote transmitter apparatus 260 which is depicted by way of example. The apparatus 200 includes transmitter and receiver circuits 211 and 212, as well as an antenna 213 via which signals may be received and transmitted, respectively processed by a receiver processor 250 and a transmitter processor 220. The apparatus 200 also includes controller/processor circuit 230, which includes distance assessment block 231, energy assessment block 232, and subchannel selection block 233. The distance and energy assessment blocks 231 and 232 operate to assess distance and energy of received communications carried out on various subchannels, and the subchannel selection block 233 utilizes this information to select a subchannel via which transmissions are to be sent. Memory 240 can be used to store information for subchannel selection (e.g., an algorithm) and other information used to facilitate operation of the apparatus 200. Data indicative of the selected subchannel is used in generating transmissions that are sent via transmitter processor 220, transmitter 211 and antenna 213. Each of the components within the apparatus 200 may be implemented in a common circuit, as may be represented by the indicated dashed lines.

The remote transmitter apparatus 260 may be implemented in a variety of manners. By way of example, the remote transmitter apparatus 260 includes receiver and transmitter circuits 261 and 262, antenna 263, transmitter processor circuit 264 and receiver processor circuit 267. A controller/processor circuit 265 operates with memory 266 for controlling the transmission and reception of signals, as well as related processing. In some instances, the controller/processor circuit 265 also includes distance and energy assessment blocks, and a subchannel selection block, as depicted with controller/processor circuit 230.

Various embodiments may further be directed to systems including a combination of the apparatus 200 and the transmitter apparatus 260, and/or multiple additional transmitter apparatuses such as that depicted for apparatus 260. For instance, the apparatus 200 may be implemented in vehicle 101 of FIG. 1, as the apparatus 110, with the controller/processor circuit 230 employing distance assessment block 231 as block 111, energy assessment block 232 as block 112, and subchannel selection block 233 as block 113.

Figure 3:
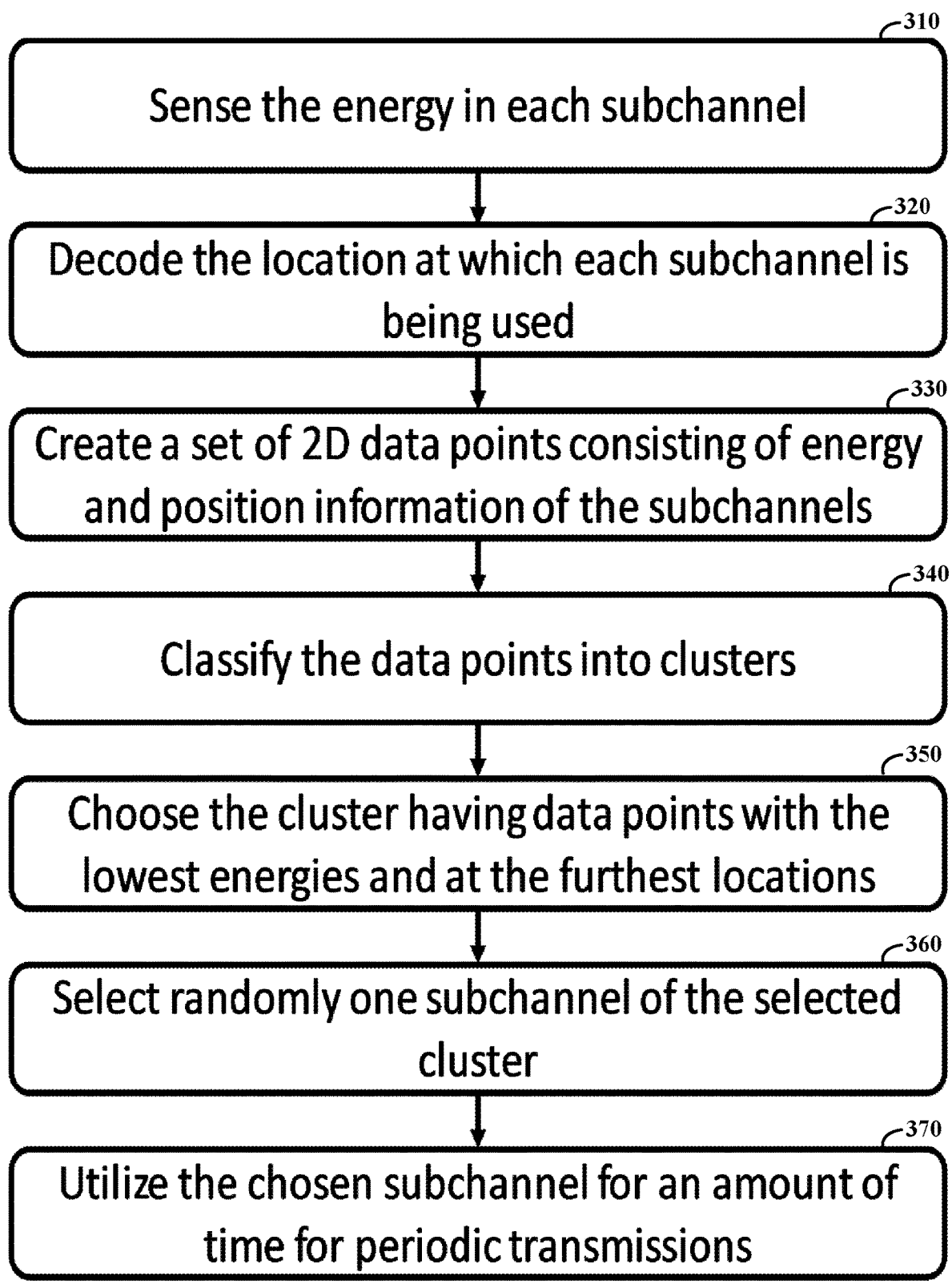
FIG. 3 shows an approach to channel selection, as may be implemented in accordance with one or more embodiments.

Referring to FIG. 3, an approach to channel selection is shown, as may be implemented in accordance with one or more embodiments. At block 310, energy in respective subchannels via which communications are received is sensed, and the location at which each subchannel is being used is decoded from the received communications. This decoding may involve, for example, ascertaining data from the communications, which indicates a geographical location as included with by a remote transmitter from which the communications emanated. A 2D set of data points is generated at block 330, in which the data points include energy and position information for the subchannels, and the data points are classified into clusters at block 340. At block 350, a cluster having data points with low energy and furthest locations (relative to a transmitter carrying out channel selection) is identified, and a subchannel from the selected cluster is randomly/pseudorandomly selected at block 360. The selected subchannel is then used at block 370, and can be carried on for a predetermined amount of time after which the process may be repeated (e.g., starting at block 310) for selecting a new subchannel. Such an approach may, for example, be utilized with subchannel selection at block 113 or at block 233.

Accordingly, the geographical position of the transmission source utilizing particular subchannels may be exploited when available, and may mitigate the severity of subchannel conflicts. For instance, subchannel reuse may be limited to those subchannels that are utilized by vehicles (or other transmitter sources) that are distant. In a particular embodiment, the 2D (bi-dimensional) set of points may be normalized to the range [0 1] (with respect to each dimension). The data points with normalized values are partitioned into a number of disjoint groups using a k-means clustering technique, in which each group is called a cluster. For instance, k-means clustering can be utilized by partitioning a number (n) of observations (distance, energy points) into a number (k) of clusters in which each observation belongs to the cluster with the nearest mean, serving as a prototype of the cluster. Subchannels may be grouped based on mutual similarities of their features: power and location. In this context, a cluster in which the subchannels have low energy and the corresponding locations are distant can be targeted for allocation and selection of a subchannel therefrom. Various specific clustering approaches may be implemented in connection with aspects characterized herein, as would be known and appreciated by the skilled artisan. See, e.g., MacKay, David, "Chapter 20. An Example Inference Task: Clustering," *Information Theory, Inference and Learning Algorithms*, Cambridge University Press. pp. 284-292 (2003).

Figure 4:
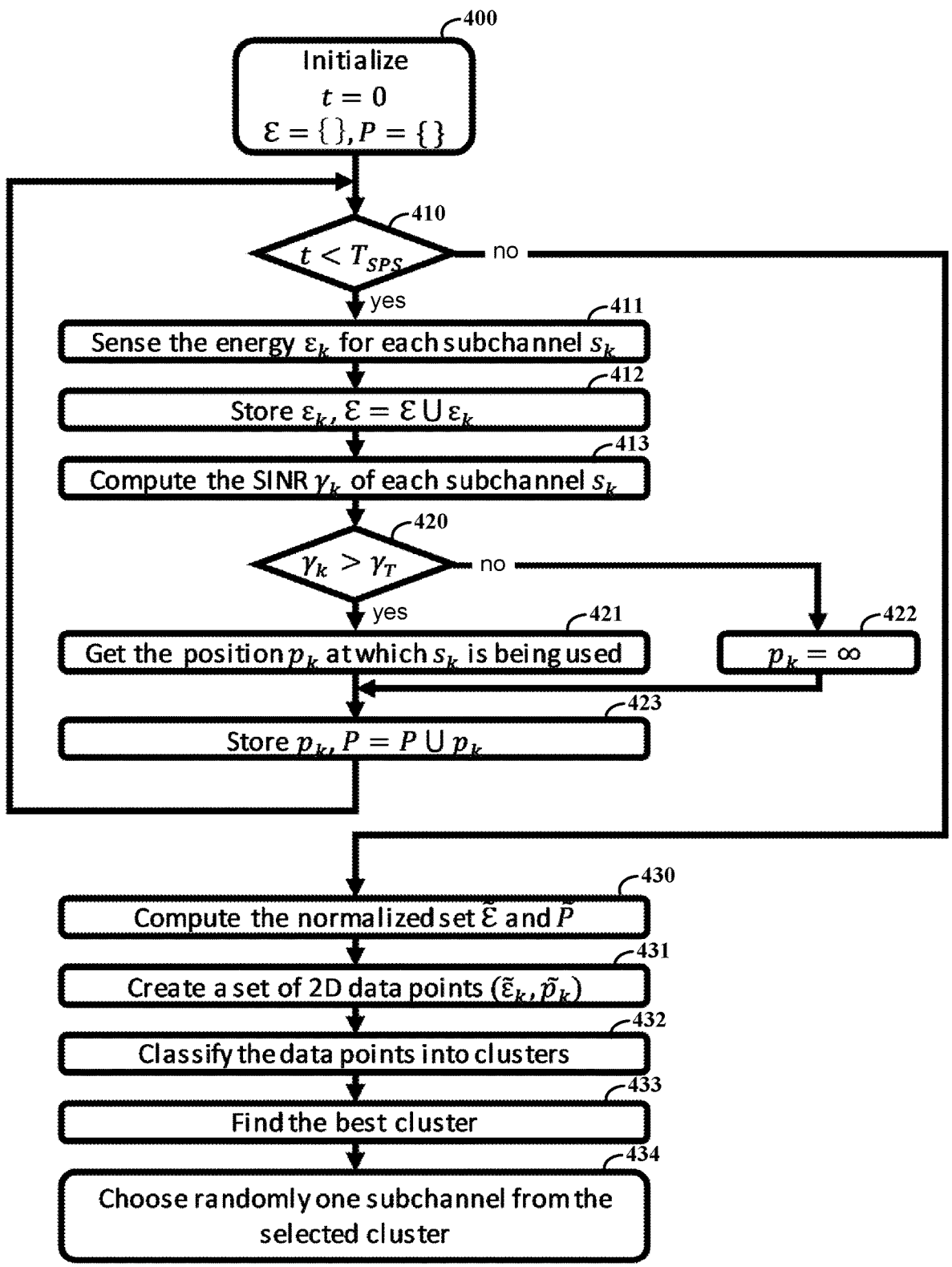
FIG. 4 shows an approach to selecting subchannels using transmitter location and energy information, as may be implemented in accordance with one or more embodiments.

In a more particular embodiment, FIG. 4 shows an approach to selecting subchannels using transmitter location and energy information, as may be implemented in accordance with one or more embodiments. At block 400, a subchannel assessment and selection process is initialized at time t=0, beginning with the assessment process that continues for communications received via respective subchannels, so long as the time t does not exceed a set time $T_{SPS}$ as noted at block 410. Energy of a received communication is assessed beginning at block 411, where for each monitorable subchannel $s_k$, the received energy $\varepsilon_k$ for a communication is recorded and stored at block 412. The SINR (signal-to-interference-plus-noise ratio) is computed for each subchannel $s_k$ at block 413. If this SINR is sufficiently high (e.g., $\gamma_k > \gamma_T$) at block 420, the received signal (packet) is decoded at block 421 and the location information of the transmitter (e.g., vehicle) using the subchannel is obtained. If the SINR is not sufficiently high at block 420, it may be assumed that the position of the vehicle $p_k$ is far as noted at block 422, in which case the subchannel is noted at being at a distance ∞ from the receiver. Alternately, if the SINR is not sufficiently high at block 420, the subchannel can simply be not used. The position data $p_k$ is stored at block 423.

The process continues at block 410 until the sensing stage has expired (when $t=T_{SPS}$), after which the values $\varepsilon_k$ and $p_k$ are normalized to the range [0 1] at block 430. At this time, the subchannels whose location was assigned a value of ∞ may have their locations updated to equal a furthest decoded distance among the subchannels from which location information was decoded. The normalized values are depicted by ($\tilde{\varepsilon}$, $\tilde{p}$). At block 431, 2D data points including of energy and location ($\tilde{\varepsilon}_k$, $\tilde{p}_k$) are created, and are classified into clusters at block 432 using a k-means algorithm. The cluster that has subchannels with relatively low energy and far locations is selected at block 433, and one of the subchannels in the selected cluster is randomly/pseudorandomly chosen at block 434 for transmission (e.g., semi-persistent transmission).

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, transmitter, subchannel selector/collector, and/or other circuit-type depictions (e.g., reference numerals 120-122 of FIGS. 1, 230 and 265 of FIG. 2 may depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 3-4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as shown in and described in connection with FIGS. 3 and/or 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, components 121 and 122 that ascertain distance and energy of communications, and subchannel selection component 120 may be implanted in a common circuit. As another example, ascertaining subchannel location and energy can be carried out simultaneously or in any order. Such modifications do not depart from the true spirit and scope of various aspects of the disclosure, including aspects set forth in the claims.

What is claimed is:

1. A method for use in a communications environment involving a plurality of remote transmitters that communicate over respective subchannels, the method comprising:
ascertaining, for each of the respective subchannels,
energy characteristics of wireless transmissions received from one of the plurality of remote transmitters over a subchannel, and
a location of the one of the plurality of remote transmitters that communicates via the subchannel;
selecting one of the respective subchannels based on the ascertained energy characteristics of the wireless transmissions and the location of the one of the plurality of remote transmitters, the selecting the one of the respective subchannels includes:
creating data points for the respective subchannels, each data point indicating energy of the wireless transmissions collected on the subchannel, and a distance value of the remote transmitter from which the wireless transmissions are collected;
grouping the data points into clusters based on the energy and distance values of the respective data points;
selecting one of the clusters depicting low energy values and high distance values, relative to other ones of the clusters; and
selecting one of the respective subchannels corresponding to one of the data points in the selected cluster; and
generating data for transmission over the selected one of the respective subchannels.

2. The method of claim 1, wherein selecting the one of the respective subchannels includes selecting one of the respective subchannels that:
has an energy value that is lower than an energy value of other ones of the respective subchannels, and
is collected from one of the remote transmitters located at a distance that is greater than a distance at which other ones of the remote transmitters are located.

3. The method of claim 1, wherein selecting one of the respective subchannels corresponding to one of the data points in the selected cluster includes pseudorandomly selecting one of the data points in the selected cluster.

4. The method of claim 1, wherein ascertaining the location of each remote transmitter includes using location information in the collected transmissions from the remote transmitters.

5. The method of claim 1, wherein the step of ascertaining is carried out in a receiver.

6. The method of claim 1, further including repeating the steps of ascertaining and selecting, based on a time period occurring after the one of the subchannels is selected.

7. The method of claim 1, wherein selecting the one of the respective subchannels includes:
for each wireless transmission, grouping data indicative of energy and a distance value of the remote transmitter from which the wireless transmission was collected, into clusters including data from other ones of the wireless transmissions, based on the energy and distance values of the data; and
pseudorandomly selecting one of the subchannels in one of the clusters depicting low energy values and high distance values, relative to other ones of the clusters.

8. An apparatus for use in a communications environment involving a plurality of remote transmitters that communicate over respective subchannels, the apparatus comprising:
first circuitry configured to ascertain, for each of the respective subchannels,
energy characteristics of wireless transmissions received from one of the plurality of remote transmitters over a subchannel, and a location of the one of the plurality of remote transmitters that communicates via the subchannel;

second circuitry configured to select one of the respective subchannels based on the ascertained energy characteristics of the wireless transmissions and the location of the one of the plurality of remote transmitters, the second circuitry further configured to select one of the subchannels by:

creating data points for the subchannels, each data point indicating energy of the wireless transmissions collected on the subchannel, and a distance value of the remote transmitter from which the wireless transmissions are collected;

grouping the data points into clusters based on the energy and distance values of the respective data points;

selecting one of the clusters depicting low energy values and high distance values, relative to other ones of the clusters; and selecting one of the subchannels corresponding to one of the data points in the selected cluster; and third circuitry configured to generate data for transmission over the selected one of the respective subchannels.

9. The apparatus of claim 8, wherein the second circuitry is configured to select one of the respective subchannels that:

has an energy value that is lower than an energy value of other ones of the respective subchannels, and is collected from one of the remote transmitters located at a distance that is greater than a distance at which other ones of the remote transmitters are located.

10. The apparatus of claim 8, wherein the second circuitry is configured to pseudorandomly select one of the data points in the selected cluster.

11. The apparatus of claim 8, wherein the first circuitry is configured to ascertain the location of each remote transmitter using location information in the collected transmissions from the remote transmitters.

12. The apparatus of claim 8, wherein the first circuitry includes a receiver configured to receive the wireless transmissions.

13. The apparatus of claim 8, wherein the first and second circuitry are respectively configured to repeat the steps of ascertaining and selecting, based on a time period occurring after the one of the respective subchannels is selected.

14. The apparatus of claim 8, wherein the first, second and third circuitry are a common processor circuit configured to carry out the respective functions of the first, second and third circuitry.

15. A method comprising:

for each of a plurality of wireless communications from different transmitters over a cellular vehicle-to-everything (V2X) communications network, ascertaining energy characteristics of a wireless transmission and location data in the wireless transmission indicative of a location of a transmitter via which the wireless transmission was sent;

selecting a subchannel in the V2X communication network based on the ascertained energy characteristics of the wireless transmission and the location data in the wireless transmission, the selecting the subchannel includes:

creating data points for subchannels, each data point indicating energy of a wireless transmission collected on the subchannel and a distance value of the transmitter from which the wireless transmission is collected;

grouping the data points into clusters based on the energy and distance values of the respective data points;

selecting one of the clusters depicting low energy values and high distance values, relative to other ones of the clusters; and pseudorandomly selecting one of the subchannels corresponding to one of the data points in the selected cluster; and transmitting data in the V2X communication network using the selected subchannel.

16. The method of claim 15, wherein the transmitters share the V2X communication network via a pool of time-frequency resource blocks, and ascertaining the energy characteristics and location data includes ascertaining energy characteristics and resource data for each communication received from the different transmitters in a respective time-frequency resource block.

17. The method of claim 15, wherein the plurality of wireless communications are distributed communications in which each of the transmitters autonomously selects its own subchannel.

* * * * *